Nov. 23, 1943.  A. J. LYONS, JR  2,334,827
AUTOMATIC HYDRAULICALLY OPERATED CONTROL FOR ELECTRICAL CIRCUITS
Filed April 9, 1942
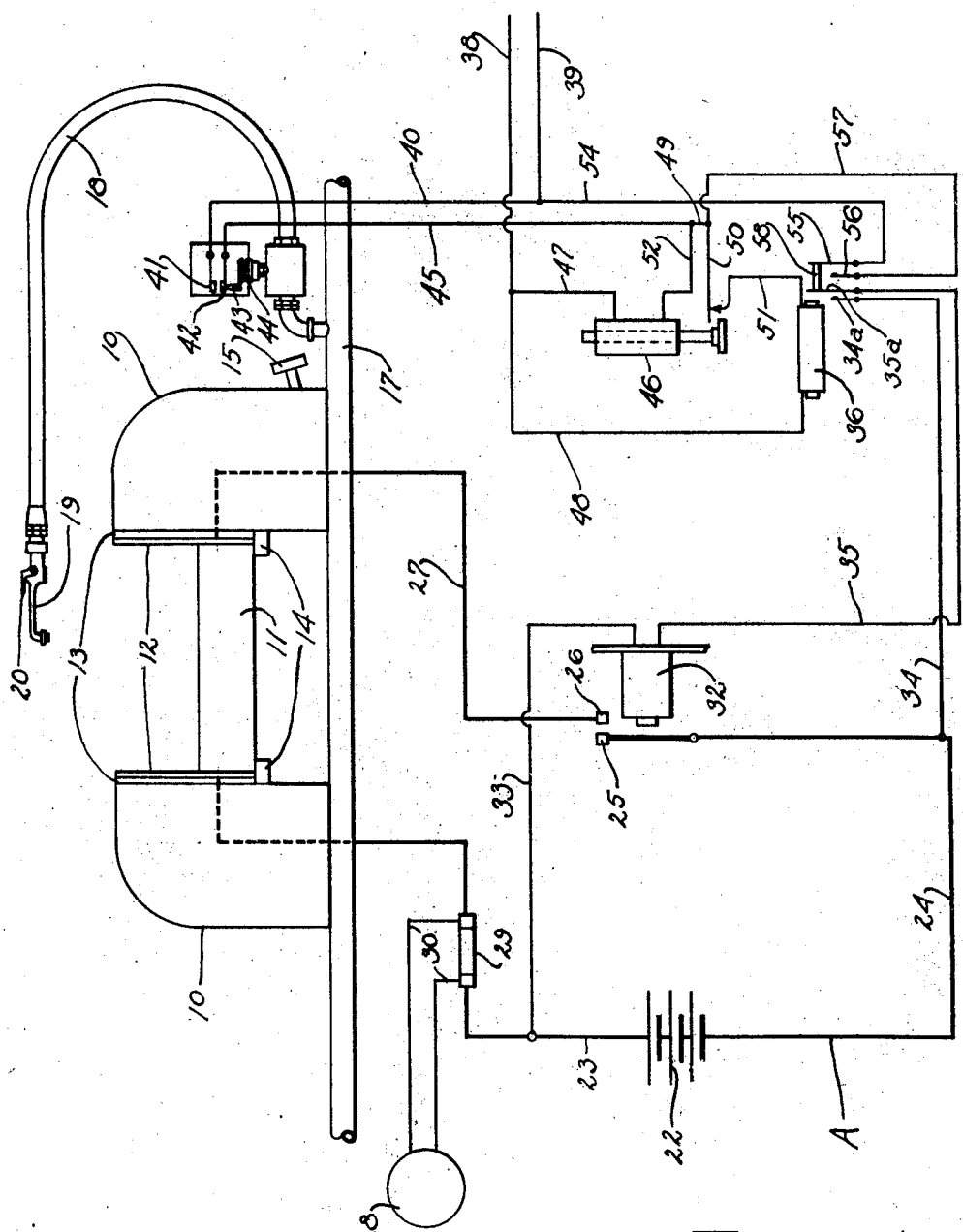
Inventor
ANDREW J. LYONS JR.
By
Attys.

Patented Nov. 23, 1943

2,334,827

UNITED STATES PATENT OFFICE 2,334,827

AUTOMATIC HYDRAULICALLY OPERATED CONTROL FOR ELECTRICAL CIRCUITS

Andrew James Lyons, Jr., Highland Park, Ill., assignor to Magnaflux Corporation, Chicago, Ill., a corporation of Delaware Application April 9, 1942, Serial No. 438,282

6 Claims. (Cl. 175—320)

This invention relates to an automatic hydraulically operated control for electrical circuits such as the circuits employed for magnetizing paramagnetic articles in testing such articles electromagnetically by means of a suspension of paramagnetic particles. More particularly, the invention pertains to circuit control means of the type indicated whose control action is initiated by a "water hammer" effect such as may be obtained in a conduit for supplying a suspension of paramagnetic particles to a paramagnetic article being tested.

It is an important object of the present invention to provide control means effective to close a normally open circuit to be controlled within a predetermined lapse of time after flow of liquid through a given conduit has been terminated and also effective to open said circuit within a predetermined interval of time after the closing of the circuit.

Another object of this invention is to provide control means for an electrical circuit responsive to a momentary surge of pressure in a confined liquid and effective to close said circuit.

A more specific object of the invention is to provide control means for electromagnetic testing devices wherein a magnetizing current is to be sent through an article being tested for a short time after a suspension of ferromagnetic particles has been applied to the article.

Other and further objects and features of the present invention will become apparent from the following description of the appended drawing (which shows diagrammatically and by way of an example control means according to the present invention as applied to an electromagnetic testing apparatus) as well as from the appended claims.

As shown on the drawing:

The circuit to be controlled forms a part of an electromagnetic testing device including opposed, relatively movable contact heads 10 for clampingly engaging an article 11 to be tested between plates 12 separated from the rest of the contact heads by insulation 13, the article 11 further being supported on insulating shelf members 14. A handwheel 15 actuates means (not shown) for locking the contact heads on a frame (not shown) in clamping position. The testing device further includes a conduit 17 for a suspension of ferromagnetic particles and a flexible hose 18 branching off from said conduit and provided with a terminal nozzle 19 for applying the suspension to the article being tested. A hand operated lever 20 on the nozzle is capable of suddenly terminating the flow of suspension through the hose and the conduit, thereby bringing about a "water hammer" effect in the hose and the conduit.

For testing purposes, the article 11 is first clamped between the heads 10 and the heads are locked in clamping position. Then, after the suspension of ferromagnetic particles has been applied to the article, a relatively heavy direct current is sent through the article for a brief time to arrange the applied ferromagnetic particles in patterns revealing the location and extension of flaws or defects in the article. The circuit of this current (which includes the article to be tested and the contact heads with their contact plates) is the circuit to be controlled and is designated generally by the reference letter A and indicated on the drawing by heavy lines.

The source of the above mentioned direct current is a battery 22 or the like having one pole connected by a conductor 23 to one contact plate 12. The other battery pole is connected to the other contact plate by conductors 24 and 27 when the circuit is closed through a movable contact arm 25 and a contact point 26. An ammeter 28 may be connected to the conductor 23 across a shunt 29 by a conductor 30.

A solenoid 32 capable of closing the contacts 25—26 is connected to the battery. The solenoid circuit includes a conductor 33 tapped off the conductor 23 and leading to one solenoid terminal, and a conductor 34 tapped off the conductor 24 and by way of a switch 34a—35a connecting through a conductor 35 to the other solenoid terminal. More particularly, the conductor 34 terminates in a contact point 34a, while the conductor 35 terminates in a contact lever 35a, which is normally spaced from the contact point 34a but capable of closing the contact when actuated by a relay 36.

As shown, energization of the relay 36 closes the circuit actuating the solenoid 32 to close the main circuit A. The main circuit remains closed as long as the relay 36 is energized, but no longer. Deenergization of the relay 36 causes the contact arm 35a to resume its normal position out of contact with the contact point 34a, whereupon the circuit energizing the solenoid 32 is broken and the contact arm 25 is released from the contact 26 to open the circuit A being controlled.

The relay 36, as well as a timer 46, are in a circuit taken off a line 38, 39 supplying 110 volt current or the like. The relay 36 and the timer 46 are connected in parallel in a circuit responsive to a "water hammer" effect in the conduit 17 to permit a momentary flow of current for energizing the relay and the timer. A holding circuit is provided, capable of energizing the timer and the relay after actuation of these members has been initiated by said momentary current. These circuits will now be described.

A conductor 40 from the line 39 is connected to a contact point 41, which cooperates with a normally open contact arm 42. Said arm 42 is moved into contacting position by an arm 43 that is actuated by a diaphragm 44 when operation of the nozzle lever 20 causes a "water hammer" effect in the conduit 17. The contact arm 42 is in turn connected to a conductor 45. The timer 46 and the relay 36 are connected in parallel to the conductor 38, respectively, by the conductors 47 and 48, and to the conductor 45, respectively, by a conductor 52 and by a conductor 49, a conductor 50 terminating in a contact arm and a conductor 51 terminating in a contact point. The contact arm 50 normally contacts the contact point 51, being movable therefrom by the pneumatic timer 46.

It will be seen that when a "water hammer" effect in the conduit 17 causes the diaphragm 44 to distend, the arm 42 is brought into contact with the contact point 41. Thereupon 110 volt current flows from the line through the conductor 40, the contacts 41—42, the conductors 45 and 49 and through the parallel conductors 52 and 50—51 to the pneumatic timer 46 and the relay 36, and then through the parallel conductors 47 and 48 to the other side 38 of the supply line. However, such flow of current is only momentary, for the "water hammer" effect in the conduit 17 closes the contacts 41—42 only momentarily.

Energization of the timer 46 and the relay 36, initiated as described hereinabove, is continued by 110 volt current sent, rather than through the conductors 40, 41, 42, and 45, through a conductor 54 connected to the conductor 39 and terminating in a normally open contact arm 55, a contact point 56 cooperating therewith, and a conductor 57 connected to the conductors 49 and 50. The contact arm 55 is moved into closed position by a member 58 responsive to the energization of the relay 36 and coupling the contacts 34a—35a and 55—56 for action in unison. The momentary surge of current brought about by the "water hammer" effect will energize the relay 36, which closes the contacts 34a—35a and also closes the contacts 55—56. The momentary flow of energizing current through the circuit including the contacts 41—42 will immediately be succeeded by the flow of energizing current through the circuit including the contacts 55—56. Both these energizing currents flow through the conductors 50 and 51 which are disconnected by the action of the timer 46 within a predetermined interval of time after the "water hammer" effect, so that after said interval the relay 36 will be deenergized and the main circuit will be reopened.

For an electromagnetic testing apparatus, this invention provides means for automatically closing the testing circuit for a predetermined period of time subsequent to the application of a testing suspension to the article being tested. The operator of the testing apparatus can therefore concentrate his attention on the application of the testing suspension and on the observation of the effects of the testing current. Application of testing current for a definite time is assured, so that strictly comparable testing results are always obtained. Obviously, the control means of the present invention are equally applicable to all other cases where the establishment or disestablishment for a definite period of time of an electric current is to be correlated with sudden surges in the flow of a fluid through a conduit.

Many details of construction may be varied within a wide range without departing from the principles of this invention, and it is therefore not my purpose to limit the patent granted in this invention otherwise than necessitated by the scope of the appended claims.

I claim as my invention:

1. In combination with a valve controlled conduit for the flow of liquid and an electrical circuit to be energized in correlation with the operation of said valve, means including a diaphragm responsive to a sudden pressure surge in said conduit upon the closing of said valve to energize said circuit.

2. In combination with a valve controlled conduit for the flow of liquid and an electrical circuit to be energized in correlation with the operation of said valve, a diaphragm responsive to a sudden pressure surge in said conduit upon the closing of said valve, means responsive to said diaphragm to close said circuit, and timing means for breaking said circuit within a predetermined interval after the circuit has been closed.

3. Apparatus for controlling an electrical circuit to correlate the same with fluid flow through a conduit, said apparatus including circuit opening and closing means in said circuit, relay responsive means for actuating said circuit opening and closing means, a relay for actuating said relay responsive means, a delayed timing device, a circuit including circuit closing means responsive to a sudden surge of pressure in the fluid in said conduit for momentarily energizing said relay and said timing device, and another circuit for energizing said timing device and said relay subject to be broken by delayed action of said timing device and including circuit closing means responsive to said relay.

4. Apparatus for correlating an electrical circuit with sudden surges of pressure in a fluid in a conduit, said apparatus including circuit opening and closing means in said circuit, relay responsive means for actuating said circuit opening and closing means, a relay for actuating said relay responsive means, a delayed timer connected electrically in parallel with said relay, an electrical circuit for momentarily energizing said relay and said timer and including a normally open circuit closing means responsive to a sudden surge of pressure in the fluid in said conduit, and another circuit for energizing said relay and said timer and including a normally open circuit closing means responsive to said relay as well as a normally closed circuit opening means responsive to said delayed timer.

5. An apparatus for correlating an electrical circuit with sudden surges of pressure in a fluid in a conduit, said apparatus including circuit opening and closing means in said circuit, relay responsive means for actuating said circuit opening and closing means, a relay for actuating said relay responsive means, a delayed timer connected electrically in parallel with said relay, an electrical circuit for momentarily energizing said relay and said timer and including normally open circuit closing means responsive to a sudden surge of pressure in the fluid in said conduit, and another circuit for energizing said relay and said timer including normally open circuit closing means responsive to said delayed timer, said two circuits for energizing said relay and said timer having a common source of electrical current and being operative successively to energize said relay and thereby to control said first mentioned circuit.

6. An apparatus for correlating an electrical circuit with sudden surges of pressure in a fluid in a conduit, said apparatus including circuit opening and closing means in said circuit, relay responsive means for actuating said circuit opening and closing means, a second circuit including a delayed timer and normally open circuit closing means momentarily closing upon a sudden surge of pressure in the fluid in said conduit, a third circuit parallel with said second circuit and including said timer, and normally closed circuit opening means responsive to said delayed timer as well as relay responsive circuit closing means, and a relay energizable by said second and third circuits and effective to actuate said relay responsive means in said first and third circuits.

ANDREW JAMES LYONS, Jr.